United States Patent [19]

Jäger

[11] 3,770,283

[45] Nov. 6, 1973

[54] RECORDING AND/OR PLAY-BACK APPARATUS

[75] Inventor: Lothar Jäger, Vienna, Austria

[73] Assignee: U.S. Phillips Corporation, New York, N.Y.

[22] Filed: Jan. 21, 1971

[21] Appl. No.: 108,421

[30] Foreign Application Priority Data

Feb. 6, 1970 Austria.................................... 1116

[52] U.S. Cl................................................ 274/4 E
[51] Int. Cl............................................. G11b 5/48
[58] Field of Search .................... 274/4 C, 4 R, 4 E, 274/11 C

[56] References Cited

UNITED STATES PATENTS

| | | | |
|---|---|---|---|
| 3,601,558 | 8/1971 | Sugaya et al. | 274/4 E |
| 3,635,423 | 2/1970 | Lennie | 274/4 E |
| 3,445,116 | 5/1969 | Knox | 274/4 A |
| 3,417,938 | 12/1968 | Markakis et al. | 274/4 E |
| 3,394,898 | 7/1968 | Laa | 274/4 E |

FOREIGN PATENTS OR APPLICATIONS

| | | | |
|---|---|---|---|
| 1,190,215 | 4/1965 | Germany | 274/4 E |

*Primary Examiner*—Harry N. Haroian
*Attorney*—Frank R. Trifari

[57] ABSTRACT

A recording and/or playback apparatus for recording and playing recordings on a tape-shaped record carrier accommodated within a box-shaped cartridge is provided. The cartridge is of the standard cassette type having a top, a bottom and four side walls with one of the side walls provided with at least one opening to accommodate therethrough a magnetic head. The apparatus has at least one magnetic head securely mounted in a fixed position on the frame with a tape guide surface connected to the head for engagement with the tape in the cartridge. The apparatus has a support structure movable between a position within which the cassette is loaded into the support and a position in which the cartridge is placed in an operative position. The support is pivotably mounted about a pivotal axis arranged close to the magnetic head so that when the support with the cartridge carried therein is pivoted about the axis, the tape guide surface of the magnetic head will automatically penetrate the opening in the side wall of the cartridge into cooperative engagement with the tape. At the same time a tape driving spindle mounted on the apparatus will simultaneously engage the tape carrying core of the cartridge for driving the tape.

4 Claims, 6 Drawing Figures

INVENTOR.

LOTHAR JÄGER

BY [signature]

INVENTOR.
LOTHAR JÄGER
BY
AGENT

RECORDING AND/OR PLAY-BACK APPARATUS

The invention relates to a recording and/or play-back apparatus including at least one magnetic head having a tape guide surface for co-operation with a tape-shaped record carrier which is accommodated in a box-shaped cartridge. One side wall of the cartridge has at least one opening for the introduction of the tape guide surface into the cartridge. The cartridge is adapted to be inserted with one of its side walls leading into a support of the apparatus. The support has an insertion opening and arranged on a frame of the apparatus for pivotal movement about a pivotal axis between a loading position and an operative position. In the loading position it is possible to insert a cartridge into the insertion opening and in the operative position at least one tape-winding core is arranged so as to be coupled with a corresponding tape-drive spindle disposed on the apparatus. The pivotal axis of the support extends parallel to a plane at right angles to the direction of insertion of the cartridge into the support. In a known apparatus of this type the pivotal axis of the support is disposed so that the insertion opening in the support faces the magnetic head. In the said arrangement the magnetic head is displaceable in the apparatus so as to permit its tape guide surface to be introduced into the opening in the side wall of a cartridge which by means of the support has been placed in its operative position, and thus to be operatively connected to the record carrier, which hereinafter will be referred to as tape. This requires a special mechanism for displacing the magnetic head.

Although, in tape recorders using a capstan for the movement of the tape, the said known arrangement has proved to be quite satisfactory, the invention provides an arrangement which is constructionally simpler and may be used to advantage in apparatus in which the tape is advanced by the tape-drive spindle only, without the use of a capstan. In an apparatus of the type mentioned at the beginning of the specification, the invention is characterized in that the magnetic head is fixedly mounted on the frame, the pivotal axis of the support extending close to the magnetic head. The support is provided with stops having abutment faces which limit the insertion path of a cartridge into the support, while when the support is moved into its operative position the tape guide surface of the magnetic head penetrates into the opening in the side wall of a cartridge which has been inserted into the support with the said side wall leading and co-operates with the record carrier. This ensures that in order to render the apparatus fully operational, it is only necessary to insert a cartridge into the support with the side wall containing the opening for the magnetic head leading and subsequently to move the support into its operative position. This results in very simple operation of the apparatus.

It has been found to be of particular advantage for the pivotal axis of the support to be located close to the upper surface of the magnetic head, facing away from the frame and lies substantially in a plane defined by the abutment faces of the stops provided in the support if this support is in its operative position, the pivotal axis being spaced from the tape-drive spindle by a distance which is greater than the distance by which the tape guide surface of the magnetic head is spaced from the said tape-drive spindle. This provides an arrangement which occupies little space whilst facilitating pivotal movement of the support.

In order to ensure stable positioning of a cartridge relative to the magnetic head it has been found to be advantageous for a cartridge inserted into the support to be resiliently urged into engagement with the stops in the support.

Obviously, the stops provided in the support for limiting the insertion path of a cartridge into the support may take various forms, for example the form of projections which protrude into the insertion path of a cartridge at a suitable location. A particularly simple construction is obtained when the stops are directly constituted by a lateral wall of the support in which at least one opening for the passage of the magnetic head is provided and which extends at right angles to the direction of insertion of a cartridge into the support.

Embodiments of the invention will now be described, by way of example, with reference to the accompanying diagrammatic drawings, in which.

Figure 1:
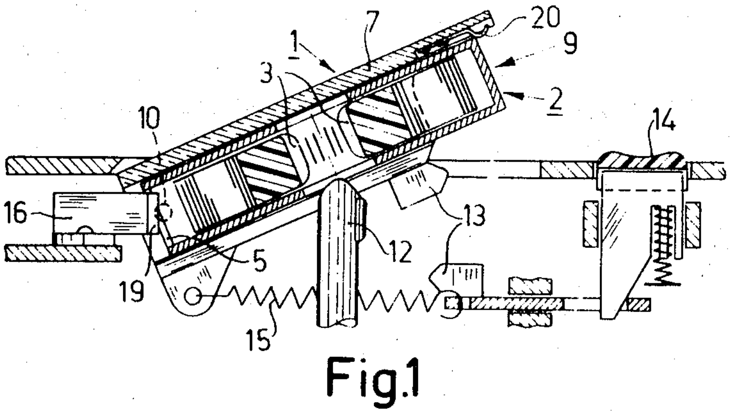
FIG. 1 is a part side elevation, part sectional view of a first embodiment in which a cartridge has been inserted into a support in the loading position thereof.
Figures 2, 3, 4:
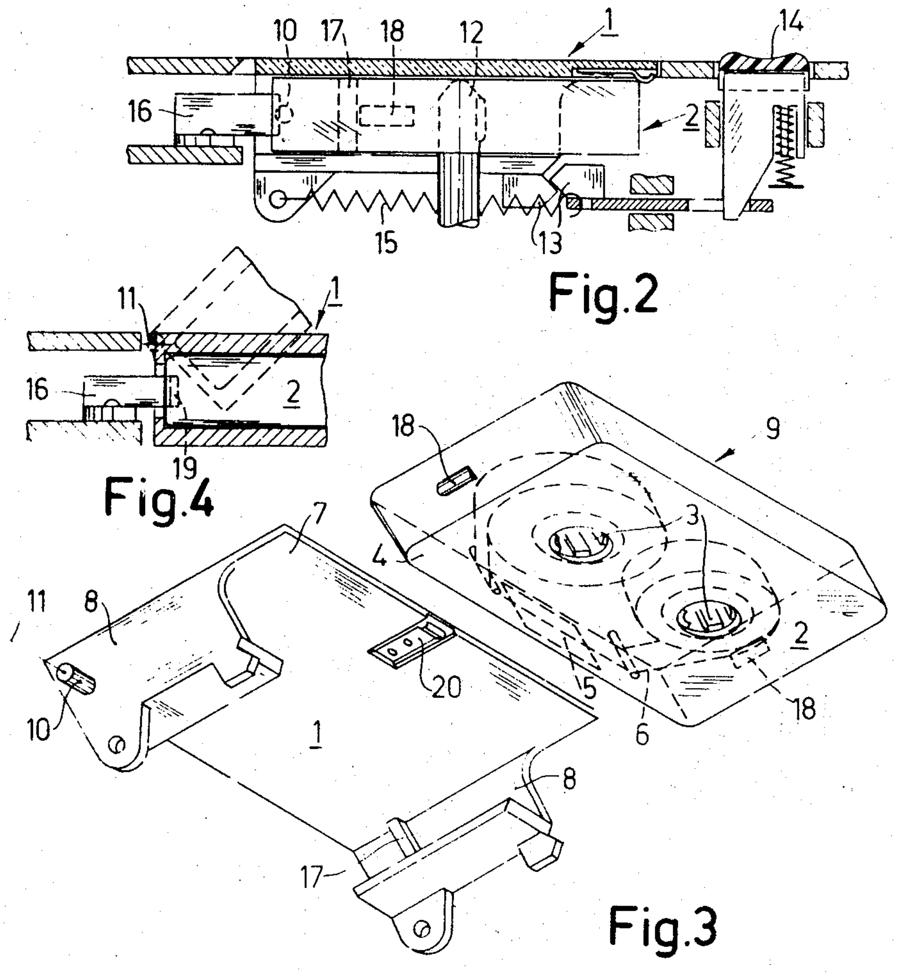
FIG. 2 is a similar view of the support which together with the cartridge has been moved into its operative position.
FIG. 3 is a perspective view of the support of FIG. 1 and of a cartridge disposed in front of the insertion opening.
FIG. 4 is a part side elevation, part sectional view of a support in which the pivotal axis is differently disposed.

Referring now to FIGS. 1 to 3, there is shown a support 1 intended to receive a box-shaped cartridge 2. The cartridge accommodates in the conventional manner a tape 6 which extends between two tape-winding cores 3 past an opening 5 formed in a side wall 4 of the cartridge. The opening 5 serves for the introduction of a tape guide surface of a magnetic head to establish an operative connection between the head and the tape.

The support 1 has an upper part 7 which at two opposed edges is provided with insertion channels 8 into which a cartridge can be inserted in the direction indicated by the arrow 9. Each channel carries an outwardly projecting trunnion 10 and the two trunnions together form a pivotal axis 11 for the support. The support is mounted in the apparatus so as to be pivotable between two positions by means of the said trunnions. FIG. 1 shows the support in one of these positions, in which a cartridge can be inserted, and FIG. 2 shows the other position, in which an inserted cartridge is in its operative position in which the tape-winding cores 3 in the cartridge have been coupled with corresponding tape-drive spindles 12 in the apparatus. The support is held in the operative position by a locking device 13, which may be disengaged by an operating member 14. A spring 15 is provided to return the support to its initial position.

According to the invention, the magnetic head 16 provided to co-operate with the tape is fixedly secured in the apparatus, and the pivotal axis 11 of the support extends close to the said magnetic head, with the result that the support performs a pivotal movement about the fixed magnetic head. Furthermore, stops 17 are provided in the support, in the present embodiment at the insertion channels 8, which stops in co-operation with lateral projections 18 of the cartridge limit the insertion path of a cartridge into the support, so that the position of a cartridge accommodated in the support and hence the position of such a cartridge relative to the magnetic head 16 is fixed. A cartridge is inserted into the support with the side wall 4 in which the opening 5 is formed leading, so that the opening 5 in the cartridge side wall 4 will become located adjacent the magnetic head 16.

As a result, a cartridge inserted into the support will, as FIG. 1 shows, directly occupy a position relative to the magnetic head such that immediately after the support has been moved into its operative position (FIG. 2) the apparatus is ready for operation, for during this pivotal movement of the support the tape-guide surface 19 of the magnetic head 16 automatically penetrates into the opening 5 in the side wall 4 of the cartridge and hence enters into operative engagement with the tape 6 without the need for further steps.

By a leaf spring 20 secured to the support part 7 a force component in the direction of insertion is exerted on the cartridge inserted into the support, and this ensures that such a cartridge always tightly engages the stops 17. Thus its position in the support relative to the magnetic head will always be defined.

Since constructional requirements will be different in each different type of apparatus, there are many different possibilities of selecting the position of the pivotal axis of the support close to the magnetic head without departing from the scope of the invention.

In the aforedescribed embodiment the pivotal axis 11 of the support is located slightly in front of, and about at the level of the centre of, the tape guide surface 19 of the magnetic head. Thus, part of the tape guide surface of the magnetic head protrudes into the opening 5 in a cartridge inserted into the support even in the loading position of the support, as is shown in FIG. 1. When the support is moved into its operative position, the guide surface 19 penetrates further into the cartridge opening 5 and the tape 3 has only to engage this surface correctly.

In the embodiment shown in FIG. 4, another location of the pivotal axis 11 of the support has been chosen, the pivotal axis lying slightly above the magnetic head 16 and behind the tape guide surface 19. In FIG. 4 the loading position of the support for the insertion of a cartridge is shown in broken lines, and it can be seen that in this position of the support the entire tape guide surface 19 of the magnetic head still is outside the support.

The pivotal axis may obviously extend close to the magnetic head and slightly beneath it, in which case it may be of advantage to make a recess in the upper part of the support adjacent the magnetic head, thus providing a correspondingly increased pivoting range for the support. As has been mentioned hereinbefore, a designer has a great latitude in this respect within the scope of the invention. However, in any case it is an essential feature that the tape guide face of the magnetic head is caused to operatively engage the tape by merely pivoting the support into the operative position.

Figure 5:
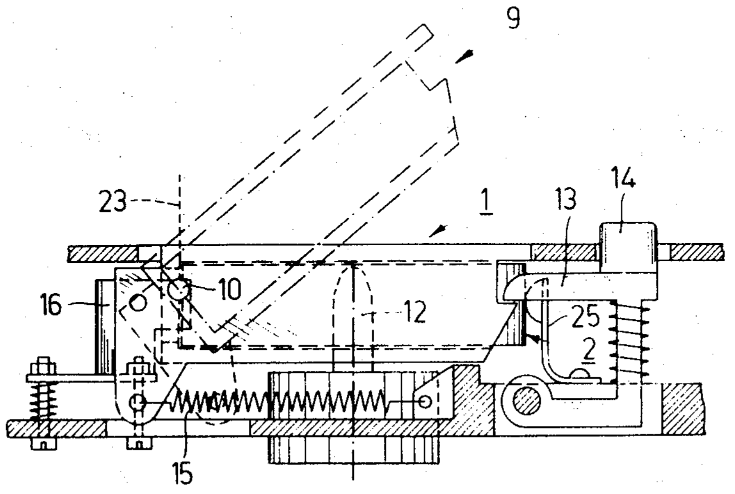
FIG. 5 is a sectional view of an embodiment in which the pivotal axis of the support is disposed at still another, advantageous location.
Figure 6:
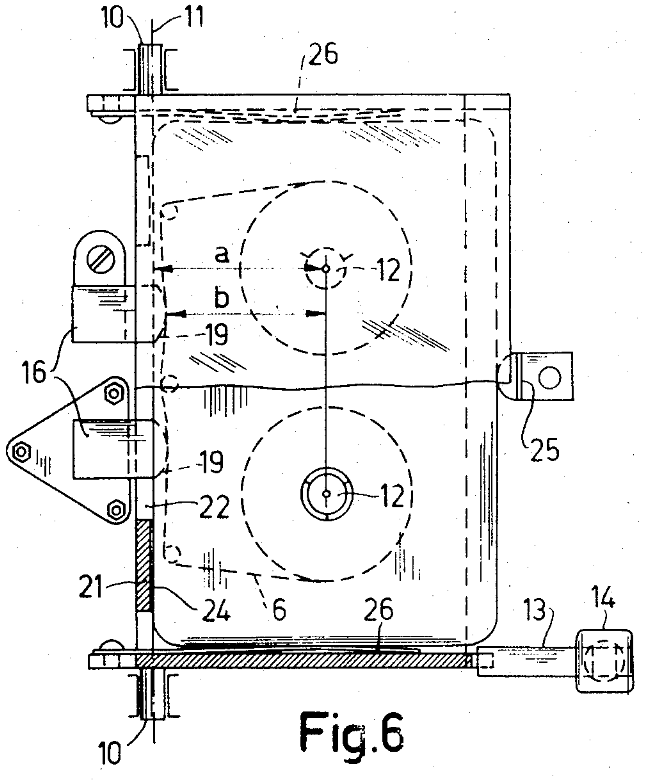
FIG. 6 is a top plan view of the embodiment of FIG. 5.

In the embodiment shown in FIGS. 5 and 6 the stops in the support 1 are directly constituted by a lateral wall 21 of the support which extends at right angles to the direction of insertion 9 of a cartridge into a support. An opening 22 in this lateral wall permits the passage of two magnetic heads 16 into the cartridge accommodating space of the support. In this embodiment, the pivotal axis 11 of the support extends close to the upper surfaces of the magnetic heads, which surfaces face away from the frame of the apparatus, and substantially in a plane 23 which is defined by the abutment faces 24 of the stops formed in the support by the lateral wall 21 in the operative position of the support. The pivotal axis 11 is spaced from the tape-drive spindles 12 by a distance *a* which is greater than the distance *b* by which the spindles 12 are spaced from the tape guide surfaces 19 of the magnetic heads 16.

The operation is similar to that in the aforedescribed embodiments. When the support is in the position shown in broken lines in FIG. 5, a cartridge can be inserted in the direction indicated by the arrow 9. By simply moving the support into the operative position, the tape guide surfaces 19 of the magnetic heads 16 operatively engage the tape 6, and at the same time the tape drive spindles 12 provided in the apparatus are coupled in a conventional manner with the tape winding cores 3 in the cartridge. As practice has shown, the location of the pivotal axis as chosen in the embodiment under consideration provides particularly advantageous constructional conditions with a view to the pivoting range of the support and the penetration of the magnetic head into a cartridge.

In this embodiment also, a locking device 13, which may be disengaged by means of an operating member 14, holds the support in its operative position. The cartridge is urged into engagement with the stops 21 in the support by a leaf spring 25 which is mounted on the apparatus and enters into operative engagement with the cartridge when the support is moved into its operative position. Leaf springs 26 which protrude into the cartridge space of the support from the sides, serve to hold a cartridge in the support when the latter is in the loading position. If desired, centering means for defining the position of a cartridge in the support in a direction at right angles to the direction of insertion may be provided in the support.

Obviously, the invention may also applied to apparatus using cartridges which have only one tape winding core, for example, endless-tape catridges. The same applies to apparatus using a capstan, in which case the pressure roller which usually co-operates with the capstan is advantageously provided in each cartridge.

I claim:

1. A recording and/or playback apparatus for recording and playing recordings on a tape-shaped record carrier accommodated within a box-shaped cartridge within which said tape-shaped record carrier is wound about at least one tape winding core, said cartridge having a top, a bottom and four side walls, at least one opening being provided in one of said side walls, and means within said cartridge for guiding said tape-shaped record carrier along said side walls passed said opening, said apparatus comprising a frame, at least one magnetic head securely mounted in a fixed position on said frame, a tape guide surface connected with said magnetic head for cooperative engagement with said tape-shaped record carrier within said cartridge, a cartridge support movably mounted on said frame between a loading position and an operative position, an insertion opening provided on said support for receiving said box-shaped cartridge with the side wall having the opening therein leading into the support when the support is in the loading position, means mounted on said cartridge support for allowing pivotal movement of said cartridge support between said loading position and said operative position for simultaneously causing said tape guide surface to penetrate the opening in the side wall of the cartridge and engage the tape-shaped record carrier, said means comprising a pivotal axis of the support extending parallel to a plane which is perpendicular to the direction of insertion of the cartridge into the cartridge support and being located at that end of said cartridge support adjacent said magnetic head, at least one tape driving spindle arranged on said frame for engagement with said tape winding core of said cartridge when said cartridge support carrying a cartridge is moved about said pivotal axis to the operative position so that the tape-shaped record carrier may be driven by said spindle, and mechanical stop means arranged on said support for limiting the depth of insertion of the cartridge into the support so that when said support is moved to the operative position said tape guide surface will penetrate said opening by the proper amount for engagement with the tape.

2. The apparatus according to claim 1 further comprising means for resiliently urging said cartridge into engagement with the mechanical stops provided in said support.

3. The apparatus according to claim 1 wherein said stops are formed by a lateral wall of the support which extends perpendicular to the direction of insertion of a cartridge into the support, and at least one opening provided in said lateral wall of said support for allowing passage of the magnetic head therethrough.

4. A recording and/or playback apparatus for recording and playing recordings on a tape-shaped record carrier accommodated within a box-shaped cartridge within which said tape-shaped record carrier is wound about at least one tape winding core, said cartridge having a top, a bottom and four side walls, at least one opening being provided in one of said side walls, and means within said cartridge for guiding said tape-shaped record carrier along said side walls passed said opening, said apparatus comprising a frame, at least one magnetic head securely mounted in a fixed position on said frame, a tape guide surface connected with said magnetic head for cooperative engagement with said tape-shaped record carrier within said cartridge, a cartridge support movably mounted on said frame between a loading position and an operative position, means mounted on said cartridge support for allowing pivotal movement of said cartridge support between said loading and operative positions about a pivotal axis, an insertion opening provided on said support for receiving said box-shaped cartridge with the side wall having the opening leading into the support when the support is in the loading position, said pivotal axis of the support extending parallel to a plane which is perpendicular to the direction of insertion of the cartridge into the cartridge support, at least one tape driving spindle arranged on said frame for engagement with said tape winding core of said cartridge when said cartridge support carrying a cartridge is moved about said pivotal axis to the operative position so that the tape-shaped record carrier may be driven by said spindle, the pivotal axis of the support being located at a position close to the magnetic head so that when the support is pivoted to the operative position said tape guide surface of the magnetic head will penetrate the opening in the side wall of the cartridge and into cooperative engagement with the tape-shaped record carrier, and mechanical stop means arranged on said support for limiting the depth of insertion of the cartridge into the support so that when said support is moved to the operative position said tape guide surface will penetrate said opening by the proper amount for engagement with the tape, said pivotal axis of said cartridge support being located at a point close to the upper surface of said magnetic head facing away from the frame and lying substantially in a plane defined by the abutment faces of the stops provided in the support when the support is in its operative position, said pivotal axis being spaced from said tape drive spindle by the apparatus by a distance greater than the distance by which the tape-guide surface of the magnetic head is spaced from tape-drive spindle.

* * * * *